Dec. 20, 1949     J. R. WOODYARD ET AL     2,491,542
OBJECT DETECTOR AND VELOCITY INDICATOR
Filed Sept. 7, 1943
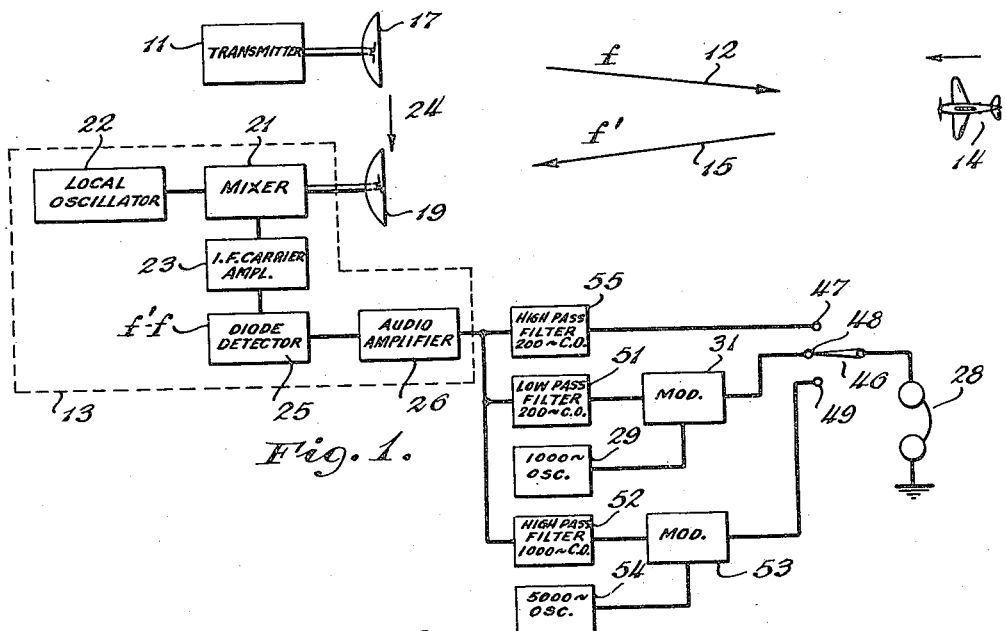
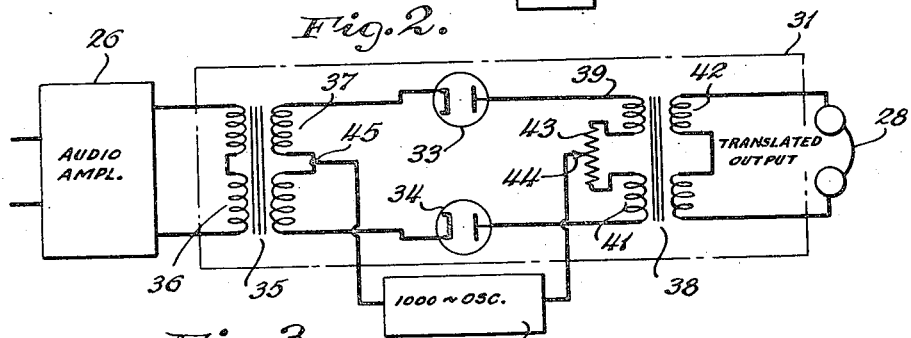
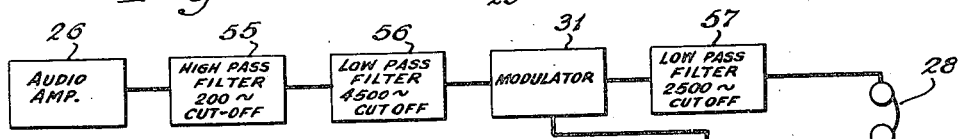
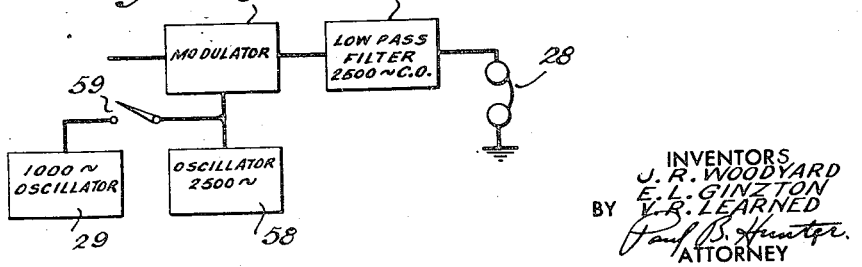
INVENTORS
J. R. WOODYARD
E. L. GINZTON
BY V. R. LEARNED
ATTORNEY Patented Dec. 20, 1949

2,491,542

UNITED STATES PATENT OFFICE 2,491,542

OBJECT DETECTOR AND VELOCITY INDICATOR

John R. Woodyard and Edward L. Ginzton, Garden City, and Vincent R. Learned, Hempstead, N. Y., assignors to The Sperry Corporation, a corporation of Delaware Application September 7, 1943, Serial No. 501,457

4 Claims. (Cl. 343—8)

The present invention relates to object detectors and concerns particularly object detecting systems of the type employing continuous-wave electromagnetic radiation and the Doppler effect.

An object of the invention is to provide improved systems for measuring velocity of remote objects.

Another object is to increase the velocity range of velocity indications in systems of the continuous wave type in which relatively short electromagnetic waves are projected from a transmitter and reflected back to the point of transmission in case a moving object is present in the line of projection.

A further object of the invention is to provide Doppler frequency translators for continuous wave systems.

Still another object of the invention is to provide arrangements for making the range of Doppler type velocity indicators adjustable and to provide for automatic range adjustments, if desired.

Still another object of the invention is to provide means for keeping the Doppler note within the audible range for widely varying velocities of the detected object.

An additional object is to provide means for facilitating the detection and speed measurement of very slowly or very rapidly moving objects.

Other and further objects and advantages of the invention will become apparent as the description proceeds.

In a type of object detector and velocity indicator which has already been proposed, a Doppler note is produced when a detected object moves toward or away from an observation station; and the pitch of the Doppler note varies with the variation in the speed of the component of motion of the object toward or away from the observation station. For example, in such a system when a ten-centimeter electromagnetic carrier is employed, a beat or Doppler frequency is produced which equals approximately ten cycles per second per mile per hour. Thus, in the case of very slowly moving objects of the speed of the order of one mile per hour, the Doppler frequency is only ten cycles per second, which is below the normal audible range of the human ear and it becomes extremely difficult to detect such slowly moving objects. A similar difficulty arises in connection with quite rapidly moving objects, for example, an aircraft flying toward an observation station at four hundred miles per hour produces a 4000-cycle note, which is higher than the pitch to which the human ear is most responsive. It is accordingly an object of the invention to provide an arrangement for modifying the pitch of the note supplied to the aural equipment in such a manner as to make the note audible.

In carrying out the invention in a preferred form thereof, a continuous wave Doppler system of a type heretofore proposed may be employed and one or more Doppler frequency translators of different range are employed for translating the Doppler note to an audible note for Doppler notes which are below or above the most sensitive portion of the frequency range of the human ear.

Filter means may be provided for allowing the Doppler note to pass directly to the earphones when the pitch of the Doppler note is within audible range, and for switching in Doppler frequency translators when the Doppler note lies above or below certain limits in pitch.

A better understanding of the invention will be afforded by the following detailed description considered in connection with the accompanying drawing, in which Fig. 1 is a schematic block diagram of one embodiment of the invention, Fig. 2 is an electrical circuit diagram of a portion of the apparatus of Fig. 1.

Fig. 3 is a fragmentary schematic block diagram of another embodiment of the invention; and Fig. 4 is a fragmentary schematic block diagram of still another embodiment of the invention.

Like reference characters are utilized throughout the drawing to designate like parts.

A type of Doppler frequency object detecting and speed indicating system which has heretofore been proposed is represented in simplified form by certain elements shown schematically in Fig. 1. Such a system may include a transmitter 11 for projecting a beam of continuous microwaves in a direction represented by the arrow 12 and a receiver 13 for picking up waves reflected back to the point of transmission in case an object 14 should lie in the direction of the transmission path 12. A return beam is represented by an arrow 15, but it will be understood that in practice the distance to the detected object 14 is so great that the paths 12 and 15 are for practical purposes along the same line.

The transmitter 11 comprises a radio frequency generator producing a wave having a frequency $f$. A suitable antenna 17, such as a dipole and parabola type of radiator, is provided for projecting microwaves in a narrow beam along the direction 12.

The receiver 13 may utilize the same radiator 17, but for simplicity it is shown as having a separate receiving antenna 19. The receiver may be of the superheterodyne type with a mixer 21 of the crystal or other suitable type receiving energy from both the antenna 19 and a local oscillator 22.

If the receiver is of the superheterodyne type it may have one or more intermediate-frequency-carrier amplifiers 23. For demodulating the output a detector such as a diode detector 25, for example, is provided and for providing an indication of the velocity of the detected object 14, more specifically the component of the velocity along the direction 12, a pair of headphones 28 is connected to the output of the detector 25. It will be understood that it will ordinarily be desirable to interpose an audio amplifier 26 between the detector 25 and the headphones or other electro-acoustic responsive device.

In such apparatus as heretofore proposed, the motion of the object 14 causes the frequency of the reflected microwaves received by the antenna 19 to be different from the frequency of the waves emitted by the radiator 17. This effect is known as the Doppler effect. The waves emitted by the radiator 17 are of the carrier frequency $f$. Since some leakage from the radiator 17 to the receiving antenna 19 takes place, as represented by the arrow 24, both the original frequency $f$ and a frequency $f'$ displaced by the Doppler effect enters the receiver 13. The amplifier 23 passes both the frequency $f$ and the frequency $f'$. The two frequencies $f$ and $f'$ beat and the detector 25 supplies a Doppler beat frequency $(f-f')$ which varies with velocity of the object 14. This may be fed directly to the headphone 28.

The determination of the velocity of motion is made by determining the pitch of the Doppler note produced in the earphones 28. This may be done by ear so long as the velocity of the object is such that the Doppler note is within the audible range of frequency. However, the ear is best able to detect variations in frequency in an intermediate band in the audio frequency range and likewise the ear is best able to distinguish a sinusoidal note from noise including many frequencies when the note to be distinguished is in a mid-frequency range. This range may comprise about 200 cycles centered on 1000 cycle pitch. Consequently even though the Doppler note may be within the audible range of frequency, better results are obtained when the Doppler note is close to 1000 cycles.

For conditions when the velocity of the detected object 14 is such that the Doppler note in the earphones 28 will be beyond the effective audible range, the apparatus heretofore described is modified or is augmented by additional apparatus for translating the frequency of the note actually heard in the earphones 28.

For the case when the velocity of the object 14 is so low that the Doppler note is below the readily detected audible range, a frequency translater is interposed between the detector 25 or the audio amplifier 26 and the earphones 28 which steps up the frequency to a suitable value such as approximately 1000 cycles per second. Such a frequency translator may take the form of a 1000-cycle oscillator 29 supplying current to the headphones 28 through a balanced modulator 31 arranged to be modulated by the output of the audio amplifier 26.

A suitable form of Doppler frequency translator is represented schematically in Fig. 2. Although a modulator of the triode or grid controlled vacuum tube type may be employed, the balanced modulator 31 is shown in Fig. 2 as being of the type utilizing a pair of rectifiers or diodes 33 and 34. A transformer 35 may be interposed between the audio amplifier 26 and the diodes 33 and 34 with a primary winding connected to the output of the audio amplifier 26 and a center-tapped secondary winding 37 connected to the electrodes of like polarity, for example, the cathodes of the diodes 33 and 34.

An output transformer 38 is interposed between the diodes 33 and 34 and the earphones 28. The transformer 38 comprises a pair of serially connected primary windings 39 and 41, and a secondary winding 42. Each of the primary windings is connected at one end to the remaining electrode, in this case the anode, of one of the diodes 33 and 34. For balance adjustment a potentiometer 43 is connected in series with the primary windings 39 and 41 and is provided with an adjustable tap 44.

The output terminals of the one-thousand cycle oscillator 29 are connected between the center tap 45 of the transformer winding 37 and the adjustable potentiometer tap 44.

The arrangement illustrated in Fig. 2 has the advantage that the thousand cycle note from the oscillator 29 is substantially inaudible when there is no input from the audio amplifier 26, provided a perfect balance is obtained by proper setting of the balancing tap 44.

Assuming a condition of balance the connection of the balanced modulator 31 with respect to the audio oscillator 29 is symmetrical so that no current flows in the earphones 28 when the balance is not disturbed by any input from the audio amplifier 26 to the transformer 35. In the event of the presence of a detected object 14 (Fig. 1) moving at a speed of approximately one mile per hour, for example, an audio signal will be supplied by the audio amplifier 26 having a frequency of approximately ten cycles per second. Since the transformer secondary winding 37 is connected with points of opposite polarity to the electrodes of like polarity of the diodes 33 and 34, the ten-cycle signal acts to unbalance the balanced modulator circuit and alternately causes predominating thousand cycle current to flow in the windings 39 and 41 of the transformer 38 and through the earphones 28. Accordingly, a fluctuating thousand cycle note will be produced in the earphones 28 when a slowly moving object such as the object 14 comes within the beam of the continuous wave transmitter.

It will be understood that the action of the balanced modulator is to balance out the 1000 cycle component of the current flowing in the earphones 28. Actually upper and lower sidebands, such as 1010 cycles and 990 cycles are produced which beat together to sound to the ear like a warbling 1000 cycle note. The sidebands will ordinarily not be separately discernible as long as the object 14 is travelling very slowly, but if its speed increases, causing the Doppler note to rise in pitch, separate sidebands will become discernible to the more sensitive ears, thus providing an indication of increasing speed of the detected object 14. Although the earphone current also contains a 10 cycle component when the detected object is travelling at one mile an hour, this component will ordinarily not be readily detected by the ear.

The provision of a frequency translator for making very low frequency Doppler notes audible serves to prevent blind spots by making the apparatus responsive to very low components of velocity. Otherwise an airplane might possibly succeed in getting into a blind spot by flying nearly perpendicularly to the line 12 to the transmitter, thus making its component of velocity toward the detector apparatus very small.

Capability of responding to low components of velocity may be useful also for enabling a boundary such as a long coastline to be patrolled by a few detector equipments with their beams 12 and 15 directed nearly parallel to the coast so that intruders landing on the coast would cross one of the beams. Although such intruders crossed the beams nearly perpendicularly they would exhibit a small component of velocity which would be detected by the apparatus described.

In a case where the detected object such as 14 is travelling at a far higher rate of speed, such as 400 miles per hour, producing a Doppler note of 4000 cycles the note heard in the earphones 28 may be translated to a thousand cycle note by substituting a 5000 cycle oscillator for the thousand cycle oscillator 29. In this case upper and lower sidebands at 9000 and 1000 cycles are produced in the earphones 28, but the 9000 cycle note is relatively inaudible. The pitch of the thousand cycle side band will of course vary as the speed of the detected object 14 varies from 400 miles per hour, and causes variations in the assumed 4000 cycle Doppler note supplied by the audio amplifier 26.

A changeover switch 46 may be provided having a plurality of positions 47, 48 and 49 for use according to the speed of the object 14 to be detected. The switch 46 is left in the position 47 when the Doppler note is to be heard directly in the earphones 28, is moved to the position 48 when a low speed object such as one that may be travelling at one mile per hour is to be detected and is moved to position 49 when high speed objects such as an airplane are to be detected.

In order to increase the effectiveness of the system and eliminate some noise frequencies which are of substantially the same magnitude throughout the audio spectrum, a low pass filter 51 may be interposed between the audio amplifier 26 and the modulator 31, the output of which is connected to the switch contact 48. The low pass filter 51 may be so designed, for example, as to pass frequencies below 200 cycles per second.

For translating the frequency of Doppler notes above the audio range, an alternative Doppler frequency translation system may be provided comprising a high pass filter 52, a modulator 53 and a higher frequency audio oscillator such as a 5000 cycle oscillator 54 for example. The filter 52 may be designed to cut off below 1000 cycles for instance. The modulator 53 has an output circuit to the switch contact 49. The modulators 31 and 53 may be of the same type. In practice the same modulator may be employed in connection with both the 1000 cycle oscillator 29 and the 5000 cycle oscillator 54 by employing suitable switching means for interchanging the connection of the modulators from one filter and oscillator to the other. To simplify the drawings, however, two different modulators 31 and 53 have been shown.

If desired, the apparatus of Fig. 1 may be arranged to respond selectively to various classes of moving objects according to the setting of a selector switch such as the switch 46. For selecting objects according to speed, filters of appropriate cut-off value may be interposed in the connections selectively controlled by the switch 46. For example, in order to render the apparatus selectively responsive to marching infantry, moving tanks and low flying airplanes which may be concealed by natural cover; such as, woods, clouds or (in the case of airplanes) lowness of altitude, 200 cycle and 1000 cycle cut-off filters may be provided. The 1000 cycle high pass filter 52 in the connection to the terminal 49 of the selector switch 46 causes the apparatus to be selectively responsive to airplanes when the switch 46 is in the position 49.

The 200 cycle cut-off low-pass filter 51 in the connection to the selector switch terminal 48 renders the apparatus selectively responsive to marching infantry. For cutting out rumbling noise it may be advantageous to introduce a 200 cycle high-pass filter 55 in the connection to the selector switch terminal 47 and this renders the apparatus selectively responsive to moving tanks.

To avoid the possibility of losing the indication of a moving object in case the switch 46 is not connected in the proper position for detecting objects of the proper speed, the circuit may be so arranged that the output of the audio amplifier 26 passes through the modulator 31 continuously and the audio frequency carrier oscillator also supplies the modulator continuously but becomes effective only when the audio frequency is beyond the audio range.

For example, if the apparatus is to be designed both to detect objects which produce Doppler notes within the effective audio range and to detect airplanes travelling at speeds such as 400 miles per hour which would produce a Doppler note of 4000 cycles per second, the arrangement of Fig. 3 may be employed. In this embodiment the modulator 31 is permanently connected between the output of the audio amplifier 26 and the earphones 28. To eliminate a substantial portion of the noise, particularly rumbling effects, high pass filter 55 having a cutoff at about 200 cycles per second may be interposed between the modulator 31 and the audio amplifier 26. If desired, an additional but low pass filter 56 having a cutoff of about 4500 cycles, for example, may be interposed between the modulator 31 and the high pass filter 55. The receiver 13 or the audio amplifier 26 may of course be so designed as to pass frequencies primarily between 200 cycles and 4500 cycles. In this case the modulator 31 is operated with a 5000 cycle carrier. Assuming that the airplane to be detected is travelling at 400 miles per hour along the direction 12 and producing a 4000 cycle Doppler note, the Doppler note will beat with the 5000 cycle carrier of the oscillator 54 and produce a 1000 cycle note in the earphones 28. To cut off the direct passage of the 4000 cycle Doppler note to the earphones 28 a low pass filter 57, cutting-off at about 2500 cycles, may be interposed between the modulator 31 and the earphones 28.

As the Doppler note falls in the case of detected objects travelling at diminishing speeds, the frequency difference between the Doppler note and the 5000 cycle carrier frequency will increase and a higher note will be heard in the headphones 28.

However, when the Doppler note falls to the pitch at which it may readily be detected directly by the earphones 28, for example, below 2500 cycles, the beat frequency will become greater than 2500 cycles and thus the beat will be eliminated from the earphones 28 by the low pass filter 57. Any objects travelling at lower speeds than this will produce Doppler notes which are heard directly in the earphones 28. Since such a system will ordinarily be employed only for detecting airplanes, there will be no need for the direct pickup of Doppler notes lower than the 200 cycles since a 200 cycle Doppler note corresponds to a speed of only 20 miles per hour. The high pass filter 55, which helps to minimize rumbling noises, does not interfere with the detection of moving airplanes.

In the arrangement of Fig. 3 a system has been described which connects the earphones 28 to pick up an indication of a moving object whether the actual Doppler note is in the effective audible range or within the range of frequency translation.

In this case the carrier oscillator 54 produces a frequency which is higher than the actual Doppler note and the translated frequency is a lower sideband of the output of the modulator 31. The invention, however, is not limited to this specific arrangement. If desired, for example, the audio frequency carrier oscillator may have a lower frequency than a Doppler frequency which is to be translated. For example, as shown in Fig. 4 a 2500 cycle carrier oscillator 58 may be provided. Assuming the previous case of an airplane travelling at 400 miles per hour and producing an actual Doppler note of 4000 cycles such a note will beat at 1500 cycles and produce an output or translated frequency of 1500 cycles in the headphones 28, which is within the effective audible range.

If the speed of the airplane increases, the translated frequency or pitch heard in the earphones 28 increases, and likewise if the speed decreases the pitch falls. If the speed of an approaching airplane falls to below 250 miles per hour the Doppler frequency will fall to 2500 cycles and zero beat effect will be produced with the oscillator 58.

Any further reductions in speed will produce a rising translated frequency instead of a falling frequency. However, when the speed of the airplane diminishes to a point at which the Doppler frequency is less than 2500 cycles the Doppler frequency will pass directly through the modulator 31 and the low pass filter 57 enabling the Doppler note to be heard directly in the earphones 28. Simultaneous reduction of a beat note with the oscillator 58 will have an effect in the earphones, thus enabling the operator to observe whether the detected airplane is travelling above or below 250 miles per hour.

The arrangement may be made such that it will respond to objects to be detected of any speed, regardless of whether the Doppler frequency produced is within the effective audible range or above or below the effective audible range. This may be done by providing a plurality of carrier frequency oscillators all of which are simultaneously supplying carrier frequency to the modulator 31 so that either the Doppler frequency itself or one of the beat frequencies between the Doppler frequency and one of the carrier frequencies will be within the effective audible range. For example, as indicated in Fig. 4, a second carrier frequency oscillator such as the thousand-cycle oscillator 29 or a plurality of carrier frequency oscillators having different frequencies may be connected through the switch 59 to the carrier frequency input connection of the modulator 31. When it is desired to make the apparatus of Fig. 4 responsive to low speed as well as to high speed moving objects, the switch 59 is closed. Inasmuch as the modulator 31 is of the balanced type, the currents from the audio carrier frequency oscillators 29, 58 or any other oscillators which may be provided, will have no effect on the phones 28, and no sound will be heard in the phones 28 when there is no Doppler frequency input from the audio amplifier 26 to the modulator 31.

Certain embodiments of the invention and certain methods of operation embraced therein have been shown and particularly described for the purpose of explaining the principle of operation of the invention and showing its application, but it will be obvious to those skilled in the art that many modifications and variations are possible, and it is intended therefore, to cover all such modifications and variations as fall within the scope of the invention which is defined in the appended claims.

What is claimed is:

1. In a Doppler frequency system for detecting relative movement of a distant object toward and away from an observation point, means for transmitting radio energy of a substantially fixed, high frequency toward a distant object, means for receiving energy reflected from said object, said receiving means being responsive to energy derived directly from said transmitting means and operable to produce a Doppler beat frequency signal of a frequency proportional to the rate of change of distance between the observation point and the distant object, an electroacoustical device, a pair of oscillators each having a different but fixed frequency output, the output of one oscillator being of such a frequency that when beat with a signal from said receiver of low audible and sub-audible frequencies it will produce signals of frequencies well within the audible range and the output of the other oscillator being of such a frequency as to produce when beat with a signal from said receiver of extremely high audible and supersonic frequencies signals of frequencies well within the audible range, modulator means connected with the output of said receiving means and said oscillators for producing beat frequency signals, and means for connecting the output of said receiving means and the output of said modulator means with said electroacoustical device.

2. The combination recited in claim 1 in which the last mentioned means constitutes a means for selectively connecting the output of the receiver means and the modulator means to the electroacoustical means.

3. In a Doppler frequency system for detecting relative movement of a distant object toward and away from an observation point, means for transmitting radio energy of a substantially fixed, high frequency toward a distant object, means for receiving energy reflected from said object, said receiving means being responsive to energy derived directly from said transmitting means and operable to produce a Doppler beat frequency signal of a frequency proportional to the rate of change of distance between the observation point and the distant object, an electroacoustical device, a pair of frequency selective means coupled to said receiving means for passing a range of frequencies corresponding to predetermined ranges of rates of change of the distance between said object and observation point, one of said ranges including sub-audible frequencies and the other range including extremely high audible frequencies and supersonic frequencies, a pair of oscillators each having a different but fixed frequency output, the output of one oscillator being of such frequency that when beat with a signal from said receiver of low audible and sub-audible frequencies it will produce signals of frequencies well within the audible range and the output of the other oscillator being of such frequency as to produce when beat with a signal from said receiver of extremely high audible and supersonic frequencies signals of frequencies well within the audible range, balanced modulator means coupled to the frequency selective means and to said pair of oscillators for converting the frequencies passed by said frequency selective means to frequencies within the audible range, and means for connecting the output of said receiver and the output of said modulator means with said electroacoustical device.

4. In a Doppler frequency system for detecting relative movement of a distant object toward and away from an observation point, means for transmitting radio energy of a substantially fixed, high frequency toward a distant object, means for receiving energy reflected from said object, said receiving means being responsive to energy derived directly from said transmitting means and operable to produce a Doppler beat frequency signal of a frequency proportional to the rate of change of distance between the observation point and the distant object, an electroacoustical device, a pair of frequency selective means coupled to said responsive means for respectively passing a range of frequencies corresponding to different predetermined ranges of rates of change of the distance between said object and observation point, one of said ranges including low audible and sub-audible frequencies and the other range including extremely high audible and supersonic frequencies, a pair of oscillators each having a different but fixed frequency output, the output of one oscillator being of such frequency that when beat with signals from said receiver of a low audible and sub-audible frequency it will produce signals having frequencies well within the audible range, the output of the other oscillator being of such frequency as to produce when beat with signals from said receiver of extremely high frequency and supersonic frequencies signals of frequencies well within the audible range, balanced modulator means coupled to the frequency selective means and to said pair of oscillators for converting the frequencies passed by said frequency selective means to frequencies within the audible range, means for connecting the output of said receiver and the output of said modulator means with said electroacoustical device, and further frequency selective means interposed between said receiving means and said electroacoustical device for passing signals of a predetermined frequency band directly from said receiving means to said electroacoustical device.

JOHN R. WOODYARD.
EDWARD L. GINZTON.
VINCENT R. LEARNED.

REFERENCES CITED

The following references are of record in the file of this patent:

UNITED STATES PATENTS

| Number | Name | Date |
| --- | --- | --- |
| Re. 21,955 | Chaffee | Nov. 25, 1941 |
| 1,945,952 | Nicolson | Feb. 6, 1934 |
| 1,995,285 | Albersheim et al. | Mar. 26, 1935 |
| 2,193,361 | Rice | Mar. 12, 1940 |
| 2,223,224 | Newhouse | Nov. 26, 1940 |
| 2,400,133 | Pray | May 14, 1946 |
| 2,402,464 | Suter | June 18, 1946 |